United States Patent Office 3,362,638
Patented Jan. 9, 1968

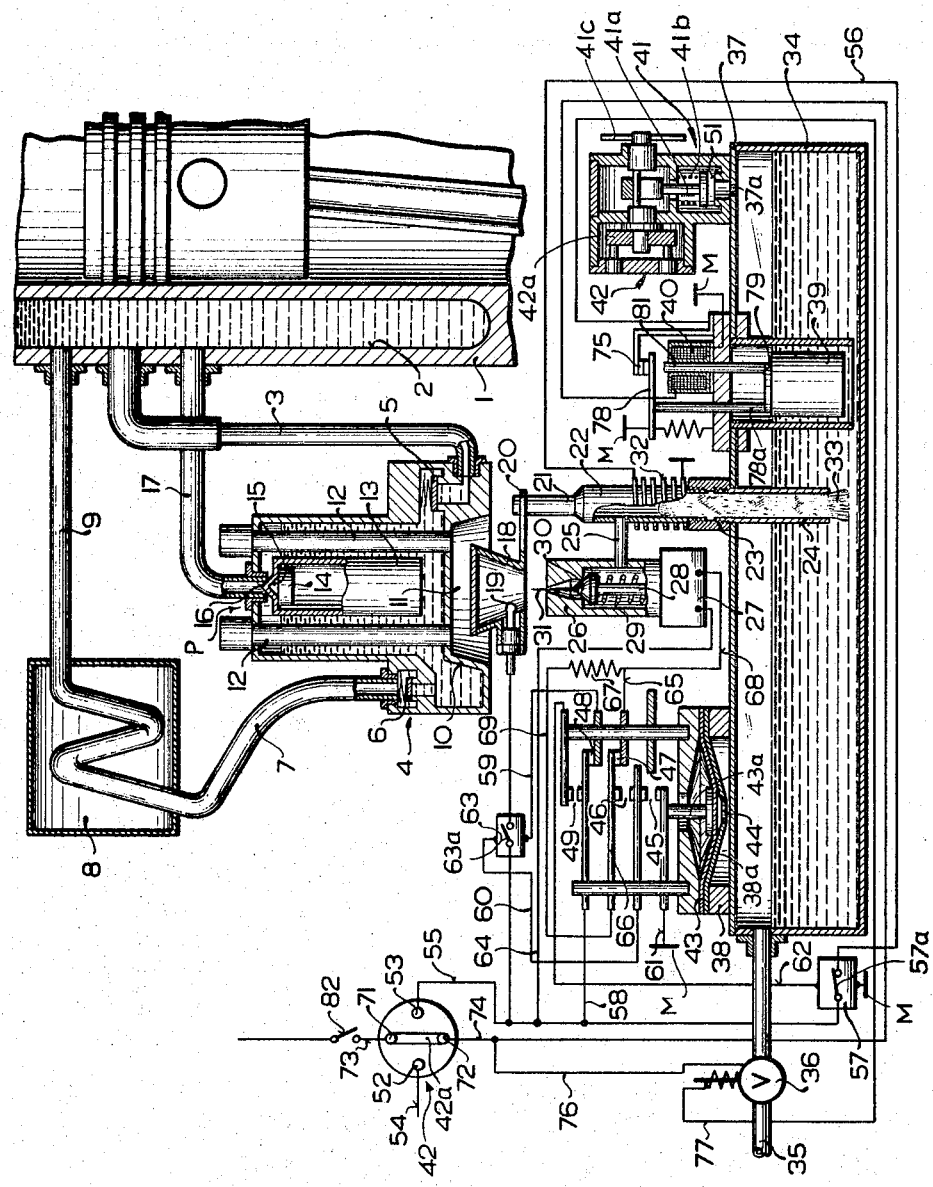

3,362,638
HEATER ARRANGEMENT FOR MOTOR CARS
Hermann Hertlein, Stuttgart, and Rudolf Linder, Stuttgart-Degerloch, Germany, assignors to Robert Bosch G.m.b.H., Stuttgart, Germany
Filed Oct. 23, 1965, Ser. No. 503,885
Claims priority, application Germany, Oct. 31, 1964, B 79,156
18 Claims. (Cl. 237—8)

ABSTRACT OF THE DISCLOSURE

Cooling water is pumped by a burner-operated pump out of and into the cylinder block of an engine and passes through a heat exchanger. The burner is heated by fuel discharged from a closed pressure vessel through a valve which is operated under the control of a diaphragm responding to the pressure in the vessel which is increased by heating a heat conductive member.

The present invention relates to a heater, and more particularly to a heater for automobiles in which the cooling water of the engine is used for heating the interior of the car.

It is one object of the invention to provide a heater which is operative even if the engine does not run.

Another object of the invention is to provide a heater capable of heating the cooling water of the engine before the same is started so that the starting is facilitated by the warmed up engine.

Another object of the invention is to provide an automatic heater for an automobile which is independent of an outer source of electric current, and requires only a small amount of battery current.

Another object of the invention is to provide a heater in which a fluid medium is circulated by a pump, and to drive the pump and heat the fluid medium by the same source of heat.

Another object of the invention is to provide in a heater, particularly in a heater for an automobile, an automatic heat producing apparatus burning gasoline supplied from the tank of the automobile.

Another object of the invention is to provide a heat producing apparatus which is automatically controlled to maintain a desired temperature by pressure responsive means.

With these objects in view, the present invention relates to a heater arrangement which is particularly suited for motor cars. One embodiment of the invention comprises container means for a fluid medium, for example the cylinder block of the engine of the motor car; conduit means connected with the cavity in the cylinder block to receive cooling water and having a heat exchanger preferably placed in the interior of the motor car; pump means for pumping the cooling water through the conduit means and heat exchanger; heat producing apparatus, preferably including a burner heated by gasoline supplied from a fuel tank of the motor car; and control means for controlling the operation of the heat producing apparatus depending on the pressure in the fuel tank.

In accordance with the invention, the thus-produced heat is not only used for heating the fluid medium, such as the cooling water, but also for driving the pump means by which the cooling water is circulated through the heat exchanger, and into and out of the cavity in the cylinder block.

In the preferred embodiment of the invention, the pump includes a floating member which is operated to perform reciprocating pumping strokes when the level of the fluid medium in the pump rises or falls depending on the pressure produced in the pump by the heat supplied by the burner.

The heat producing apparatus includes a closed vessel or fuel tank whose interior is heated by heat developed at the burner so that the pressure in the vessel varies. A fuel valve supplying fuel to the burner is automatically controlled by pressure responsive means whose movements depend on the pressure prevailing in the closed vessel of the heat producing apparatus.

The pressure responsive means control not only the fuel valve, but also the igniting means for igniting the fuel, and maintain the pressure and the amount of burned fuel substantially constant.

The operation is started by a manually operated switch which energizes an electric heating wire to heat the closed vessel of the heat producing apparatus until the pressure in the same is sufficient to actuate the pressure responsive means by which the heating wire is disconnected so that the further operations are automatically controlled by the pressure responsive means in accordance with the pressure in the closed vessel which depends on the heat produced by the burner.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing whose single figure is a fragmentary schematic vertical section, and partially an electric circuit diagram.

Referring now to the drawing, the cylinder block 1 of the combustion engine of a motor car, has a cavity or container means 2 in which cooling water circulates in the usual manner. The cooling water may also flow through the radiator, not shown.

A heat exchanger 8, which is preferably located in the interior of the motor car, surrounds a portion of a conduit means 9 which communicates with the cavity in the cylinder block. A conduit portion 7 is connected to the outlet of a pump P where a check valve 6 is located. A conduit means 3 is also connected to the cavity of the cylinder block, and supplies the cooling water to the inlet of the pump where an inlet check valve 5 is provided.

Intermediate the check valves 5 and 6, a closed chamber is formed in the pump casing 4. Consequently, conduit means 3, 7, 9 and pump chamber 4 contain cooling water which is not circulated by the cooling water circulating system of the motor car.

The casing 4 has a bottom portion 10 forming a recess 11 in which a burner 18 is located. Recess 11 communicates with the interior of two pipes 12 which pass through the inner chamber of the pump, and permit combustion gases to pass through the pump so that the water in the closed chamber is thoroughly heated. The manner in which the burner 18 is operated, will be described hereinafter in greater detail.

A pump member 13 is located in the pump chamber and includes a hollow float body and a permanent magnet 14. The upper end of the pump member has a conical projection 16 adjacent magnet 14 and cooperating with a valve seat at the end of a pipe 17 which communicates with the cavity in cylinder block 1.

When water fills the housing 4, float body 13 assumes its highest position which is shown in the drawing, so that the valve 16 is closed. Permanent magnet 14 tends to hold pump member 13 in this position, but when the level of the fluid medium in the pump drops below a certain level, the weight of the pump member 13 is sufficient to cause dropping of the pump member either to a floating position, or to the position resting on the bottom wall 10 of the housing.

When the water in the chamber of the pump is heated by burner 18, steam develops which produces an overpressure sufficient to press the water out of the pump chamber through outlet check valve 6 into conduit 7 and 9 so that the heated water passes through heat exchanger 8 for heating the interior of the motor car, and since the hot water also enters the cavity of the cylinder block, the temperature of the cooling water is increased.

When in this manner the level of the water in the closed pump chamber is lowered, the weight of pump member 13 exceeds the holding force of magnet 14, so that pump member 14 drops off, permitting steam to escape through conduit pipe 17 into the cavity of the cylinder block. Since the pressure is reduced in the pump chamber, cold water enters into the pump through conduit 3 and the opening check valve 5 until the initial water level is restored and pump member 13 has risen to the illustrated position in which valve 16 closes pipe 17 and the pump chamber whereupon the burner 18 again heats the water in the pump chamber until sufficient steam develops to press the heated water through outlet valve 6 into the heat exchanger 8 and into the cavity of the cylinder block.

In this manner, the heat produced by burner 18 is not only used for heating the water in the pump, but also for operating the pump to discharge hot water in successive pumping strokes whose frequency depends on the amount of heat supplied by burner 18, the force of magnet 14, and the weight and buoyancy of the pump member 13.

In the event that the circulation of the cooling water through the cylinder block and radiator is controlled by a thermostat in the usual manner, the water circulates only through the pump and heat exchanger 8 as long as its temperature is below 80° C., so that the radiator does not cause any heat losses. When the cooling water in the engine is heated by operation of the engine to a temperature higher than 80° C., the thermostat opens and circulation takes place through the radiator so that heat of the cooling water cannot become excessive. Since the amount of heat dissipated by the radiator is greater than the amount of heat produced by burner 18, the engine cannot overheat under any circumstances.

Burner 18 forms part of a heat producing automatically controlled apparatus which is shown in the lower portion of the drawing. A closed vessel 34 contains gasoline, or other fuel supplied by pipe 35 from the fuel tank of the motor car. An electromagnetic valve 36 is located in inlet pipe 35 and controls the amount of fuel passing through the same. A heat conductive conduit member includes a pipe 24 projecting into the interior of vessel 34, an upper pipe part 22 closed at the upper end thereof and having a solid portion 21, a double nut 23 connecting pipes 22 and 24, and a thin tube 25 connecting the interior of the pipe portion 22 with the interior of a valve 26. A wick 33 is located in the lower portion of the heat conductive conduit members 21, 22, 23 and causes the fuel in vessel 39 to rise to a region below tube 25.

Valve 26 includes a valve member 30 cooperating with a valve seat and having a needle 31 passing in the closed position of the valve through a fine opening in the valve body. A spring 29 surrounds the stem 28 of the valve member 30 and urges the same to the illustrated closed position. The lower end of stem 28 is connected to the armature of an electromagnet 27 which, when energized, overcomes the force of spring 29 and moves valve member 30 to a position in which fuel can pass through tube 25, in the interior of the valve body, and the nozzle opening of the valve into the region of burner 18. An igniting means 19 is mounted on burner 18 and ignites the fuel in the same, when connected to a source of electric voltage, as will be descibed hereinafter.

Burner 18 has an arm 20 secured to the upper end of the solid portion 21 of the heat conductive conduit member. Consequently, when the burner is heated, heat will be transferred through arm 20 and pipe portions 22, 23, 24 to the interior of the closed vessel 34, heating the same so that the temperature and thereby the pressure increases in vessel 34 causing the fuel to rise in conduit members 22, 23, 24 and to flow through tube 25 into the interior of valve 26. However, fuel can be injected into burner 18 only after electromagnetic means 27 has been energized. Whenever valve member 30, 31 is operated, needle 31 cleans the fine opening through which the fuel flows when the valve is operative.

The top plate 37 of closed vessel 34 has a large opening closed by a pressure responsive means 38 which includes a rigid plate 38a having an opening 44, and a diaphragm 43 normally abutting wall 38a and closing opening 44. A control member 43a is secured to diaphragm 43 for operating a switch including a series of springs provided with cooperating pairs of contacts 45, 46, 47, 48, 49 which are successively closed or opened starting with the lowest pair of contacts 45 when a pressure increase in vessel 34 causes rising of diaphragm 43.

Cover plate 37 has a small opening 37a permitting fuel vapor to escape until a valve member 41a is closed by a spring 41b upon operation of a manually operated knob 41c. However, in the event that the pressure in vessel 34 exceeds a predetermined limit, the spring loaded valve member 41a opens against the action of spring 41b, so that valve 41 serves as a safety valve.

Knob 41c controls a switch 42 which is diagrammatically shown in the left upper corner of the drawing as part of a circuit. Conductors 73 and 54 connect switch 42 with the positive terminal of a voltage source, such as the battery of the motor car, while the negative terminal is connected to mass. In the diagrammatic part of the drawing, connection of conductors with mass are indicated by a short transverse line M.

Switch 42 is operated to start the heater, or to terminate its operation, and also has a position permitting the filling of vessel 34.

Knob 41c operates a movable contact 42a which normally engages a pair of contacts 71 and 72. Contact 71 is connected by conductor 73 and switch 82 to the positive terminal of the battery, and contact 72 is connected by line 76 to the electromagnetic valve 36 which controls the supply of fuel from the tank of the motor car to the closed vessel 34. The other terminal of the electromagnetic fuel control valve 36 is connected by a line 77 to a pair of normally closed contacts 75 and a contact spring 78 to mass. Contact 72 of switch 42 is connected to mass also over the coil 40 of an electromagnetic fuel control device which includes a magnetic core 81 projecting into the interior of vessel 34. A magnetizable rod 78a is secured to magnetizable member 78. Float 39 has a magnetizable bridge member 79 secured to the top surface, and when a sufficient amount of fuel fills vessel 34, member 79 closes the magnetic flux through members 81, 78a, 78 so that member 78 is attracted by member 81 and the contact pair 75 opens. Electromagnetic fuel valve 36 is de-energized and closed by a spring, not shown, so that no further fuel is supplied from the tank of the motor car to vessel 34. When the fuel level drops in vessel 34, float 39 sinks, and contacts 75 close due to the resiliency of arm 78. Consequently, valve 36 is energized and opens, permitting fuel to flow into vessel 34 and to maintain the desired level of the fuel.

An electric heating wire 32 surrounds the heat conductive conduit members 21 to 24, and is connected by a line 56 over the contact 57a of a relay 57 to contact 53 of switch 42. When contact 42a is turned 90°, and relay contact 57a is closed, the heating wire 32 is energized, over contacts 52, 42a, 53, and heat is transmitted by the heat conductive conduit members 22, 23, 24 to the interior of vessel 34 causing the temperature and pressure to rise so that fuel flows into wick 33, and through tube 25 into the valve body 26.

Turning of knob 41c to place contact 42a in the position connecting contacts 53 and 54, also effects turning of an eccentric member permitting valve member 41a to close opening 37a so that the increase of heat causes also increase of pressure in the vessel. The increased heat causes vaporization of the fuel in the region of the heating wire 32 so that fuel vapor enters the interior of valve body 26.

The increased pressure acts on diaphragm 43 so that the associated switches are operated.

When the pressure in vessel 34 reaches a predetermined pressure, for example 40 to 50 cm. hydrostatic head, diaphragm 43 is displaced a certain distance causing the lowest pair of contacts 45 to close whereby a connection is established from the battery to mass over conductive circuit elements 54, 52, 42a, 53, 55, 58, 48, 59, relays 63, 60, 45, and 61. Relay 63 is energized and closes relay contact 63a which connects the battery over line 55 with the igniting means 19 whose other terminal is connected to the mass of burner 18.

When the pressure further increases in vessel 34 due to the heating by wire 32, the diaphragm 43 is further displaced so that the second pair of contacts 46 closes to effect energizing of electromagnetic means 27 by which valve 26, 30 is opened. The current flows from the battery through the conductive elements 54, 52, 42a, 53, 55, 64, electromagnetic means 27, 68, 65, 47, 66, 46, 45, 61.

As soon as electromagnetic means 27 moves valve member 28, 30, 31 to the open position, the fuel vapor contained in the interior of the valve body 26 flows into the region of burner 18 and is ignited by the previously energized heating wire of the igniting means 19. The heat produced by burner 18 heats wall 10 of pump casing 4 and combustion gases pass through pipes 12 so that the cooling water in housing 4 is heated causing the development of steam, dropping of the level of water in pump casing 4, and discharge of hot water through conduit 7 into the heat exchanger 8.

As the temperature of the burner 18 increases, heat is transmitted through the heat conductive arm 20 to the heat conductive conduit members 21 to 24, causing a further increase of the temperature in vessel 34 and a pressure increase in the same.

When a certain pressure is reached, diaphragm 43 is sufficiently displaced to cause the opening of a normally closed pair of contacts 47 which interrupt the direct connection between the electromagnetic valve control means 27 and the battery, so that electromagnetic means 27 is now connected to the battery by conductive elements 54, 52, 42a, 53, 55, 64, and by conductive element 68 to a resistor 67, which is connected over conductive element 69, closed contact pairs 46, 45, and conductive element 61 to mass. Consequently, the current flowing through electromagnetic means 27 is reduced, but still sufficient to maintain valve member 30, 31, 28 in the open position supplying fuel vapor to burner 18. It will be understood that a greater force is required for opening the valve than for maintaining the valve in open position.

Heat produced by wire 32 and by burner 18 is now further supplied to the vessel until the increased pressure displaces diaphragm 43 sufficiently to cause opening of the fourth pair of contacts 48. The circuit of relay 63 is interrupted, and relay contact 63a opens to disconnect the igniting means 19. A further increase of the pressure displaces diaphragm 43 further to cause closing of contacts 49 so that relay 57 is connected with the battery over conductive elements 54, 52, 42a, 53, 55, 58, 49, 62 so that the normally closed relay contact 57a opens and disconnects the heating wire 32 from the battery.

The heat and temperature in the vessel 34 is from now on maintained by heat conducted from the burner 18 by heat conductive conduit members 21 to 24, and the only current supplied by the battery of the motor car is the small current required by the electromagnetic valve control means 27 to maintain the fuel valve in open position. A current of 0.1 to 0.2 ampere is sufficient for this function.

When the engine is started at the beginning of a drive of the motor car, the heat producing apparatus shown in the lower portion of the drawing is disconnected by opening switch 82. The starter may now be operated, and operation of the engine started. Since electromagnetic valve control means 27 is disconnected from the battery, spring 29 moves valve member 30 into engagement with the valve seat, so that the fuel valve is closed. Needle 31 cleans the nozzle opening. This switch operation may be obtained by knob 41c which at the same time raises valve member 41a so that the pressure in vessel 34 is relieved. Contact member 42a is now in the illustrated position connecting contacts 71 and 72 so that coil 40 is energized. If the fuel in vessel 34 is at a low level, float 39 is in a lower position than illustrated, with magnetizable bridge member 79 spaced from magnetizable members 78a and 81 so that the magnetic flux produced by coil 40 is insufficient to separate contacts 75 which are closed by a spring. Consequently, the winding of fuel control valve 36 is energized, as explained above, and valve 36 opens permitting fuel to enter vessel 34 through inlet pipe 35. When a sufficient amount of fuel has flown into vessel 34, float 39 is raised to the illustrated position in which magnetizable member 79 abuts magnetizable member 78a and 81 whereby the flux produced by coil 40 is sufficient to cause attraction of member 78 by member 81, and separation of contact 75 whereby the current in the electromagnetic fuel control valve 36 is interrupted and the same closes preventing further flow of fuel into vessel 34 until float 39 has again dropped.

When knob 41c is turned to a position in which contact member 42a connects contacts 52 and 53, heating wire 32 is energized over the normally closed contact 57a of relay 57. Heat conductive conduit member 21 to 24 is heated by wire 32, and conducts heat into vessel 34 so that the temperature rises in the same. Since turning of knob 41c to the position in which contacts 52, 53 are connected by contact 42a, has caused lowering of valve member 41b, vessel 34 is closed, and the increase of heat in the same causes a pressure increase to which the pressure responsive means 38, 43 respond to successively actuate the contact pairs 45 to 49.

At the first pressure increase, contact pair 45 is closed whereby igniting means 19 is energized. After a further pressure increase, contact pair 46 is closed whereby electromagnetic valve control means 27 is energized, and valve 30 is opened so that vapor flows through the heat conductive conduit member 21 to 24 and tube 25 and through the open valve into the region of the burner 18 where the vapor is ignited and heats the burner and thereby the water contained in the pump casing 4. The heat of burner 18 is conducted through arm member 20 and heat conductive conduit member 21 to 24 into vessel 34 whereby temperature and pressure are increased, causing a further displacement of diaphragm 43, and opening of contact pair 47 which connect resistor 67 in series with electromagnetic valve control means 27 so that valve member 22 is maintained in the open position by electromagnetic valve control means 27.

Further increase of the heat and temperature of vessel 34 causes displacement of diaphragm 43 to a position in which contact pair 48 opens to de-energize relay 63 so that contact 63a opens and disconnects igniting means 19 from the battery. Igniting means 19 is no longer needed, since the burning gases in the region of burner 18 ignite fuel vapors supplied by fuel valve 26, 30.

Further increase of the temperature and pressure in vessel 34 causes diaphragm 43 to close the contact pair 49 so that relay 57 is energized and opens relay contact 57a whereby the heating wire 32 is disconnected from the battery.

The heat producing apparatus is now in its normal operating condition in which pressure in vessel 34 is maintained by heat flowing from burner 18 through members 18, and 21 to 24.

Only a small amount of battery current is used for maintaining electromagnetic valve control means 27 and coil 40 energized.

While the heat producing apparatus is thus automatically controlled to produce a certain amount of heat, the combustion gases pass through pipes 12 of the pump, and heat the cooling water contained in casing 4. The water is converted into steam which increases the pressure in pump casing 4 and presses the water against check valves 6 and 5, closing the latter, and opening outlet check valve 6 whereby hot water flows through conduit 7 and heat exchanger 8. When the level of the water drops sufficiently, the weight of pump member 13 overcomes the magnetic force of magnet 14, and pump member 13 drops permitting steam to escape through pipe 17 so that the pressure increasing force is lowered, and cold water enters through conduit 3 and inlet valve 5 into the pump casing 4, filling the same so that the float body of pump member 13 causes rising of the pump member to its upper position in which magnet 14 closes valve 16.

This operation of pump member 13 is repeated as long as heat is supplied by burner 18 to the water filled chamber in casing 4.

Assuming that the outer temperature is cold, and the cooling water has a temperature below 80° C., the conventional thermostat causes interruption of the circulation of water between the cavity in the cylinder block and the radiator. Since water heated in pump casing 4 flows through conduit 9 into the cavity in the cylinder block, the temperature of the cooling water is increased, and the motor warmed up so that starting and operation of the engine at low speeds is facilitated at low outer temperatures.

At higher temperatures, the thermostat permits a circulation of the cooling water through the radiator, and the constant amount of heat supplied by burner 18 to pump casing 4 is selected so that more heat is dissipated by the radiator than is produced by burner 18 and conveyed by hot water through conduits 7 and 8 to the water in the cavity of the cylinder block.

When the motor is started, switch 42 is used for disconnecting the heat producing apparatus from the battery. The electromagnetic valve control means 27 is de-energized so that spring 29 closes valve 22, 26. An eccentric member operated by knob 41c raises valve member 41a so that the pressure in vessel 34 is relieved through opening 37a. At the same time, the connected contacts 71, 72 supply current to coil 40 so that, if the amount of fuel in vessel 34 is insufficient, a current flowing through the closed contact 75 actuates the electromagnetic fuel control valve 36 and permits fuel from the gas tank of the motor car to enter through inlet pipe 35 into vessel 34 until float 39 is sufficiently raised to cause closing of fuel inlet valve 36. The apparatus is now ready for the next heating operation. Switch 82 may be used when the ignition switch of the motor car is operated. A corresponding switch may also be provided in the other conductor 54 by which switch 42 is connected to the positive terminal of the battery.

It will be understood that each of the elements described above, or two or more together, may also find a useful application in other types of heater arrangements differing from the types described above.

While the invention has been illustrated and described as embodied in an automatic heater for heating the interior of a car and the cooling water of the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Heater arrangement comprising, in combination, container means for a fluid medium; conduit means connected with said container means; heat exchanger means in the proximity of said conduit means; pump means in said conduit means for pumping said medium through the same; burner means for heating said medium in the proximity of said pump means and for driving said pump means; a closed vessel for a fuel; a conduit member for supplying fuel from said vessel to said burner means; valve means communicating with said conduit member for controlling the flow of fluid from said vessel to said burner means; and pressure responsive means controlled by the pressure in said vessel and operating said valve means.

2. A heater arrangement as claimed in claim 1 wherein said conduit member is heat conductive and is heated by said burner means to heat the fuel in said vessel whereby the pressure in the same is increased and fuel is supplied through said conduit member and said valve means to said burner.

3. A heater arrangement as claimed in claim 2 comprising an electric heating wire in the proximity of said heat conductive conduit member for heating the same so that the same heats the fuel in said vessel whereby the pressure in the same is increased and fuel is supplied to said burner means; a switch for energizing said heating wire; and igniting means for igniting fuel supplied to said burner means so that the operation of the same is started and said heat conductive member is heated by said burner means.

4. A heater arrangement according to claim 1 wherein said container means is the cylinder block of a combustion engine forming a cavity; wherein said fluid medium is the cooling water of the engine; wherein said conduit means has two ends connected with said cavity; and wherein said heat exchanger means is adapted to be located in the interior of a motor car driven by said engine.

5. A heater arrangement according to claim 1 wherein said pump means includes a chamber for said medium having an inlet and an outlet for the medium, check valves in said inlet and outlet, and a steam outlet opening communicating with said container means, a movable pump member in said chamber responsive to an increase of temperature and pressure in said chamber, and a valve member for opening and closing said steam outlet opening and operated by said pump member whereby the same pumps said medium so that said pump means is operated by said burner means.

6. A heater arrangement according to claim 1 wherein said heat producing apparatus including igniting means for igniting fuel supplied to said burner means and being operated under the control of said pressure responsive means.

7. A heater arrangement according to claim 1, said conduit member for supplying fuel to said burner means being heat conductive and heated by the same to heat the fuel in said vessel, comprising an electric heating wire in the proximity of said conduit member for heating the same so that the same heats the fuel in said vessel whereby the pressure in the same is increased and fuel is supplied through said conduit member to said burner means; and a circuit connected with said heating wire and including a manually operated switch for energizing said heating wire and switching means operated by said pressure responsive means to disconnect said heating wire when the heat conducted by said heat conductive conduit member from said burner means into said vessel produces sufficient pressure to supply fuel to said burner means.

8. A heater arrangement according to claim 1 wherein said conduit member for supplying fuel to said burner means is heat conductive, comprising an electric heating wire in the proximity of said conduit member for heating the same so that the same heats the fuel in said vessel whereby the pressure in the same is increased and fuel is supplied through said conduit member to said burner means wherein said valve means include electromagnetic actuating means; and comprising circuit means connected with said heating wire and with said electromagnetic actuating means, and including a manually operated switch for energizing said heating wire and said electromagnetic actuating means.

9. A heater arrangement according to claim 8 wherein said circuit means include switching means operated by said pressure responsive means and connected with said electromagnetic means for controlling said valve means depending on the pressure in said closed vessel.

10. A heater arrangement according to claim 9 comprising igniting means connected into said circuit and being operated by said switching means under the control of said pressure responsive means after the latter have caused opening of said valve means and supply of fuel to said burner means.

11. A heater arrangement comprising, in combination, container means for a fluid medium; conduit means connected with said container means; heat exchanger means in the proximity of said conduit means; pump means in said conduit means for pumping said medium through said conduit means; heat producing apparatus for heating said medium and for driving said pump means; and control means for controlling the operation of said heat producing apparatus; wherein said pump means includes a chamber for said medium, which is water, said chamber having an outlet opening connected with said cavity, a pump member in said chamber including a float body and a magnet for holding said pump member in a higher position when raised with said float body by the water at high level whereby said pump member closes said outlet opening, said pump member dropping at a low level of the water, and inlet and outlet check valves for said conduit means; and wherein said heat producing apparatus heats the water in said pump means so that steam develops and increases the pressure in said chamber whereby the water level is lowered and heated water is discharged through said outlet check valve into said conduit means to heat said heat exchanger means until said pump member drops and opens said outlet opening for the discharge of steam.

12. Heater arrangement for a motor car having an engine with a cavity for cooling water, comprising, in combination, heat exchanger means adapted to be located in said motor car; conduit means passing through said heat exchanger means and having ends connected with said cavity so that cooling water flows therethrough; pump means located in said conduit means and including a closed chamber having an inlet and an outlet connected with said conduit means, said chamber having a wall, and a movable pump member in said chamber responsive to an increase of temperature and pressure in said chamber to pump said medium through said conduit means; burner means located adjacent said wall; a closed vessel for a fuel; a conduit member having one end located in said vessel and another end; electromagnetic fuel valve means communicating with said other end and being operable to supply fuel to said burner means; igniting means for igniting fuel in said burner means; heating means for heating the fuel in said vessel so that the temperature and pressure is increased in the same and fuel is supplied through said conduit member to said burner means; and control means including pressure responsive means on said vessel having switch means for controlling said igniting means and said electromagnetic fuel valve means so that fuel supplied to said burner means is ignited.

13. A heater arrangement according to claim 12 wherein said control means include a manually operated switch means; and including an electromagnetic inlet valve controlling the supply of fuel to said vessel; and circuit means connecting said electromagnetic fuel valve means, said electromagnetic inlet valve means, and said switch means of said pressure responsive means with said manually operated switch means.

14. A heater arrangement according to claim 13 including a heat conductive conduit member connecting said vessel with said fuel valve means and being in heat conductive connection with said burner means; a heating wire surrounding said heat conductive conduit member and connected into said circuit so that said wire is energized by operation of said manually operated switch means, and is de-energized at a predetermined pressure in said vessel by said switch means of said pressure responsive means; and wherein said igniting means is de-energized by said switch means of said pressure responsive means at a predetermined pressure in said vessel.

15. A heater arrangement as set forth in claim 14 and including a fuel control device having a pair of contacts connected in series with said electromagnetic inlet valve means, an electromagnetic coil, core means magnetized by said coil and including a resilient member carrying one of said contacts, and a float in said vessel carrying a magnetizable member for increasing the flux in said core means at a higher level of said fuel in said vessel whereby said contacts are opened and said electromagnetic inlet valve means is de-energized to close and to stop flow of fuel into said vessel.

16. A heater apparatus as set forth in claim 13 and including a spring-loaded valve on said vessel connected with said manually operated switch means for simultaneous manual operation so that said last mentioned valve is closed when said heating wire is energized.

17. A heater arrangement according to claim 12 wherein said pump means include a chamber for the cooling water having an outlet opening connected with said cavity, an inlet check valve and an outlet check valve for said conduit means, and a pump member in said chamber including a float body and a magnet for holding said pump member in a higher position when raised with said float body by the water at high level whereby said pump member closes said outlet opening, said pump member dropping at a lower level of the water; and wherein said heat producing apparatus heats the water in said chamber of said pump means so that steam develops and increases the pressure in said chamber whereby the water level is lowered and heated water is discharged through said outlet check valve into said conduit means to heat said heat exchanger means and the water in said cavity until said pump member drops and opens said outlet opening for the discharge of steam.

18. A heater arrangement as set forth in claim 17 wherein said pump means includes pipe means passing through said chamber and having lower ends located in the region of said burner means so that combustion gases pass through said pipe means to heat the water in said chamber of said pump means.

References Cited

UNITED STATES PATENTS

| | | | |
|---|---|---|---|
| 1,637,596 | 8/1927 | Turner | 123—142.5 |
| 2,257,756 | 10/1941 | Moric et al. | 123—142.5 |
| 2,400,977 | 5/1946 | Clarkson | 123—142.5 |
| 2,605,821 | 8/1952 | Lindahl | 158—53 X |
| 2,745,477 | 5/1956 | Welin-Berger | 158—36 |
| 2,785,741 | 3/1957 | Gravers | 158—53 |
| 2,918,219 | 12/1959 | MacCracken | 237—64 |
| 2,981,250 | 4/1961 | Stewart | 237—8 X |
| 3,072,176 | 1/1963 | Sunday | 237—12.3 X |

EDWARD J. MICHAEL, *Primary Examiner.*